United States Patent [19]

White

[11] 3,904,705

[45] Sept. 9, 1975

[54] THERMALLY STABILIZED SYNTHETIC POLYAMIDES

[75] Inventor: Trevor Raymond White, Pontypool, England

[73] Assignee: Imperial Chemical Industries Limited, London, England

[22] Filed: Nov. 30, 1973

[21] Appl. No.: 420,575

[52] U.S. Cl............................... 260/857 TW; 260/45.7 P; 260/45.7 PH; 260/45.7 PS; 260/45.75 R; 260/45.85 S; 260/45.95 R; 260/45.95 H; 260/45.9 NP; 260/78 S; 260/857 PG
[51] Int. Cl.² ............... C08G 69/46; C08L 77/00
[58] Field of Search.... 260/45.75 R, 45.95, 45.85 S, 260/45.7 PS, 45.9, 78 S, 857 TW, 857 PG

[56] References Cited
UNITED STATES PATENTS

| | | | |
|---|---|---|---|
| 2,705,227 | 3/1955 | Stamatoff | 260/45.7 |
| 2,739,123 | 3/1956 | Kennerly et al. | 260/45.7 |
| 3,595,936 | 7/1971 | Birenzvige et al. | 260/45.7 |
| 3,772,403 | 11/1973 | Wells | 260/45.85 |

OTHER PUBLICATIONS

Atmospheric Oxidation and Antioxidants, 1965; by Gerald Scott, pp. 188 to 193, 217, 295 and 296, Elsevier Press.

*Primary Examiner*—V. P. Hoke
*Attorney, Agent, or Firm*—Cushman, Darby & Cushman

[57] ABSTRACT

Polyamides are stabilized by the incorporation of a mixture of a sterically hindered phenol, a reducing phosphorus compound and sulphur-containing compound selected from a thiophosphate, a thiodipropionate and a thiocarbamate.

4 Claims, No Drawings

THERMALLY STABILIZED SYNTHETIC POLYAMIDES

The present invention relates to the stabilization of synthetic linear polyamides or copolyamides against impairment of their properties by the action of heat and oxygen and by light.

According to the present invention we provide a synthetic linear polyamide or copolyamide in which there have been incorporated from 0.005 to 0.5% by weight based on the polyamide of a sterically hindered phenol bearing a secondary or tertiary alkyl or cycloalkyl group in the ortho position, from 10 to 1,000, preferably from 25 to 250, parts per million by weight based on the polyamide of phosphorus in the form of a reducing phosphorus compound and from 0.005 to 0.5% by weight based on the polyamide of a reducing sulphur-containing compound selected from the group consisting of a metal salt, an ammonium salt or an organic ester of thiophosphoric acid, thiodipropionic acid and thiocarbamic acid.

Examples of suitable synthetic linear polyamides (which expression is to be understood as including copolyamides) are listed below:
  polyhexamethylene sebacamide
  polyhexamethylene adipamide
  polyoctamethylene adipamide
  polydecamethylene sebacamide
  polypentamethylene sebacamide
  polydodecamethylene adipamide
  poly-epsilon-caprolactam
  poly-omega-aminoundecanoic acid
  poly-m-xylylene adipamide
  polyhexamethylene isophthalamide Copolyamides derived from the following starting materials may also be mentioned:
1. hexamethylene diammonium adipate and epsilon-caprolactam.
2. hexamethylene diammonium adipate and hexamethylene diammonium sebacate.
3. hexamethylene diammonium adipate and hexamethylene diammonium isophthalate,
4. hexamethylene diammonium terephthalate and dodecamethylene diammonium terephthalate,
5. the salts from hexamethylene diamine, adipic acid and 1,4-diphenyl adipic acid.

Suitable sterically hindered phenols include those listed in British patent specification No. 1,209,592.

The reducing phosphorous compounds which may be added include ortho-phosphorous, meta-phosphorous, pyrophosphorous, hypo-phosphorous and phenylphosphinic acids, and their organic and inorganic salts and their esters.

Examples of such organic salts and esters are:
  hexamethylene diammonium di-hypophosphite
  dimethyl hydrogen orthophosphite
  tri-isodecyl orthophosphite
  diethanolammonium hypophosphite
  triethylammonium hypophosphite
  triphenyl orthophosphite Examples or reducing sulphur-containing compounds which may be added are zinc di-isopropyldithiophosphate, di-laurylthiodipropionate, di-stearylthiodipropionate, magnesium di-isopropyldithiophosphate, ammonium di-isopropyldithiophosphate and potassium di-isopropyldithiophosphate.

The present invention is particularly adapted to polyamides containing titania or other pigments, and is applicable to both acid-stabilized and base-stabilized polyamides.

Conventional adjuvants may also be added to the polyamides at any convenient stage in their manufacture, for instance; dyes, pigments, dyestuff-formers, plasticizers, resins and antistatic agents such as ethoxylated compounds.

The present invention includes shaped articles, such as fibres, filaments, yarns, films, fabrics and other textile materials, of the synthetic linear polyamide containing the stabilizing compounds.

The stabilizing compounds may be incorporated, either separately or in combination, in the polyamide by addition at any suitable stage in its manufacture. Preferably they are mixed with the polyamide starting materials before the polymerization commences. Alternatively, they may be added to the pre-formed polyamide, for instance by dusting them on to the polyamide chip prior to its melting. The stabilizing compounds may be added at suitable points in a continuous polymerization process, such as that carried out in a pipe or coil.

The following examples, in which the parts are parts by weight, are intended to illustrate, but not to limit, the invention.

EXAMPLES 1–14

6.6 nylon was prepared by the conventional method, from hexamethylene diamine and adipic acid, with the addition, at the beginning of polymerization, of a slurry containing titanium dioxide pre-coated with manganese phosphate. The titanium dioxide was added in such amount that there was approximately 2% of it in the final polymer. At the same time, various stabilizing additives were incorporated in various amounts.

200 denier, 20-filament yarns were melt spun from the polymers produced in each case. Samples of said undrawn yarns, free of finish, were tested for amine end group content (called AEG and measured in g. equivalents/$10^6$ g. polymer), carboxyl end group content (CEG and measured in g. equivalents/$10^6$ g. polymer) and Relative Viscosity (R. in the conventional manner, as well as for whiteness. The whiteness of the yarn was measured in terms of '$b$'chromaticity (b) on a Meco Colormaster Mark V colorimeter, (obtainable from Manufacturers Engineering & Equipment Corporation, Warrington, Pa. U.S.A.) using the rotating dish assembly. The colorimeter was pre-calibrated. Perfect whiteness was denoted by a value of 0.333. The yarns were than heated in air at 200°C for 30 seconds and the above mentioned tests again carried out. The results obtained are shown in the following table.

Topanol CA (Registered Trade Mark of Imperial Chemical Industries Limited) is essentially tris-(2-methyl-4-hydroxy-5-t-butylphenyl) butane.

| EXAMPLE | STABILIZING ADDITIVE | Initial analysis | | | | Change in analysis | | |
| --- | --- | --- | --- | --- | --- | --- | --- | --- |
| | | RV | AEG | CEG | b | $-\Delta$ AEG | $+\Delta$ CEG | $\Delta$ b |
| 1 | 0.05% Topanol CA + 0.1% zinc di-isopropyl-dithiophosphate + 70 ppmP as sodium hypophosphite | 39.2 | 43.5 | 72 | 0.326 | 10.1 | 5 | 0.026 |

-Continued

| EXAMPLE | STABILIZING ADDITIVE | Initial analysis | | | | Change in analysis | | |
|---|---|---|---|---|---|---|---|---|
| | | RV | AEG | CEG | b | $-\Delta$ AEG | $+\Delta$ CEG | $\Delta$ b |
| 2 | 0.05% Topanol CA + 0.1% di-laurylthio-dipropionate + 70 ppmP as sodium hypophosphite | 35.9 | 46.8 | 71 | 0.326 | 12.8 | 0 | 0.031 |
| 3 | 0.05% Topanol CA + 0.1% distearyl-thiodipropionate + 70 ppmP as sodium hypophosphite | 36.1 | 43.0 | 75 | 0.327 | 8.8 | 0 | 0.031 |
| 4 | 0.05% Topanol CA + 145 ppmP as sodium hypophosphite + 0.05% zinc di-isopropyldithiophosphate | 38.8 | 46.7 | 63 | 0.328 | 3.9 | 4 | 0.016 |
| 5 | 0.05% Topanol CA + 145 ppmP as sodium hypophosphite + 0.1% zinc di-isopropyl-dithiophosphate | 39.2 | 48.2 | 67 | 0.327 | 3.8 | 3.5 | 0.016 |
| 6 | 0.05% Topanol CA + 145 ppmP as sodium hypophosphite + 0.1% magnesium di-isopropyl-dithiophosphate | 36.7 | 49.3 | 69.5 | 0.327 | 8.0 | 1.5 | 0.016 |
| 7 | 0.05% Topanol CA + 145 ppmP as sodium hypophosphite + 0.1% ammonium di-isopropyl-dithiophosphate | 38.4 | 46.2 | 63 | 0.326 | 8.6 | 5 | 0.017 |
| 8 | 0.05% Topanol CA + 145 ppmP as sodium hypophosphite + 0.1% potassium di-isopropyl-di-thiophosphate | 37.2 | 47.1 | 64 | 0.326 | 6.0 | 6 | 0.017 |

| EXAMPLE | STABILIZING ADDITIVE | Initial analysis | | Change in analysis | |
|---|---|---|---|---|---|
| | | AEG | b | $-\Delta$ AEG | $\Delta$ b |
| 9 | 0.05% Naugard 442 + 145 ppm P as sodium hypophosphite + 0.1% Zinc diisopropyl dithiophosphate | 46.7 | 0.325 | 5.6 | 0.016 |
| 10 | 0.05% 3-methyl-6-t-Butyl phenol + 145 ppm P as sodium hypophosphite + 0.1% Zinc diisopropyl dithiophosphate | 47.5 | 0.327 | 8.1 | 0.019 |
| 11 | 0.05% Antioxydant 1093 + 145 ppm P as sodium hypophosphite + 0.1% zinc diisopropyl dithiophosphate | 46.6 | 0.327 | 4.5 | 0.020 |
| 12 | 0.05% Topanol CA + 145 ppm P as sodium hypophosphite + 0.1% Zinc dibenzyl dithiocarbonate | 48.3 | 0.325 | 6.9 | 0.019 |
| 13 | 0.05% Topanol CA + 145 ppm P as sodium hypophosphite + 0.1% Zinc dinonyl dithiocarbonate | 51.0 | 0.319 | 7.4 | 0.018 |
| 14 | 0.05% Topanol CA + 145 ppm P as sodium hypophosphite + 0.1% Zinc thiodipropionate | 59.0 | 0.319 | 12.7 | 0.032 |

COMPARATIVE EXAMPLES A–M

For comparison, a range of 200 denier, 20 filament poly(hexamethylene adipamide) undrawn yarns were melt spun, the stabilizing additive, if any, being outside the scope of the present invention. The initial properties of the yarns and the change in these properties upon heating the yarns in air at 220°C for 30 seconds are shown in the following table.

| EXAMPLE | STABILIZING ADDITIVE | Initial analysis | | | | Change in analysis | | |
|---|---|---|---|---|---|---|---|---|
| | | RV | AEG | CEG | b | $-\Delta$ AEG | $+\Delta$ CEG | $\Delta$ b |
| A | None | 36.5 | 42.6 | 68 | 0.323 | 20.4 | 14 | 0.056 |
| B | 0.05% Topanol CA | 34.0 | 46.5 | 65 | 0.321 | 16.9 | 10.5 | 0.050 |
| C | 75 ppmP as sodium hypophosphite | 35.3 | 46.8 | 70 | 0.326 | 21.2 | 13 | 0.047 |
| D | 145 ppmP as sodium hypophosphite | 36.0 | 50.9 | 66 | 0.327 | 22.4 | 15 | 0.048 |
| E | 0.05% zinc di-iso-propyldithiophosphate | 36.5 | 45.7 | 73 | 0.324 | 17.1 | 2.5 | 0.036 |
| F | 0.1% zinc di-iso-propyldithiophosphate | 37.3 | 44.8 | 69.5 | 0.327 | 15.4 | 3 | 0.037 |
| G | 0.1% dilaurylthiodipropionate | 36.2 | 44.3 | 66 | 0.323 | 20.8 | 15 | 0.052 |
| H | 0.1% distearyl-thiodipropionate | 34.1 | 46.1 | 65 | 0.324 | 21.6 | 12 | 0.051 |
| I | 0.05% Topanol CA + 70 ppmP as sodium hypophosphite | 35.3 | 44.3 | 64.5 | 0.326 | 14.4 | 17 | 0.052 |
| J | 0.05% Topanol CA + 0.1% zinc di-isopropyl-dithiophosphate | 36.6 | 44.6 | 90 | 0.326 | 17.3 | −7 | 0.038 |
| K | 0.05% Topanol CA + 0.5% distearyl-thiodipropionate | 32.1 | 42.4 | 69 | 0.321 | 21.1 | 14 | 0.051 |
| L | 0.05% Topanol CA + 0.5% di-lauryl-thiodipropionate | 34.3 | 44.0 | 74 | 0.323 | 19.9 | 0 | 0.044 |
| M | 0.03% Topanol CA + 145 ppmP as sodium hypophosphite | 37.4 | 46.1 | 64.5 | 0.324 | 18.8 | 10 | 0.036 |

EXAMPLES 15–23

These examples are similar to Examples 1–14 except that the 6,6 nylon also contained 5% by weight of an ethoxylated polycaproamide antistatic agent.

COMPARATIVE EXAMPLES N–O

These examples are the same as Examples 15–23 except that the stabilizing additives are outside the scope of the present invention.

| EXAMPLE | STABILIZING ADDITIVE | Initial analysis | | Change in analysis | |
|---|---|---|---|---|---|
| | | AEG | B | $-\Delta$ AEG | $\Delta$ b |
| N | 0.05% Topanol CA + 100 ppm P as sodium hypophosphite | 56.8 | 0.322 | 13.7 | 0.029 |
| O | 0.1% Topanol CA + 100 ppm P as sodium hypophosphite | 62.8 | 0.321 | 13.4 | 0.036 |
| 15 | 0.05% Topanol CA + 100 ppm P as sodium hypophosphite + 0.05% Zinc diisopropyl dithiophosphate | 56.6 | 0.321 | 11.2 | 0.030 |
| 16 | 0.05% Topanol CA + 100 ppm P as sodium hypophosphite + 0.1% Zinc diisopropyl dithiophosphate | 62.7 | 0.323 | 7.3 | 0.024 |
| 17 | 0.05% Topanol CA + 100 ppm P as sodium hypophosphite + 0.2% Zinc diisopropyl dithiophosphate | 61.0 | 0.323 | 3.6 | 0.018 |
| 18 | 0.05% Topanol CA + 50 ppm P as sodium hypophosphite + 0.1% Zinc diisopropyl dithiophosphate | 60.4 | 0.323 | 9.9 | 0.025 |
| 19 | 0.05% Topanol CA + 100 ppm P as barium hypophosphite + 0.1% Zinc diisopropyl dithiophosphate | 57.0 | 0.323 | 7.5 | 0.021 |
| 20 | 0.05% Topanol CA + 100 ppm P as sodium hypophosphite + 0.1% Zinc dibenzyl dithiocarbonate | 61.4 | 0.314 | 13.1 | 0.027 |
| 21 | 0.05% Topanol CA + 100 ppm P as sodium hypophosphite + 0.1% Zinc thiodipropionate | 75.8 | 0.321 | 21.5 | 0.044 |
| 22 | 0.05% Topanol CA + 100 ppm P as sodium hypophosphite + 0.1% sodium thiodipropionate | 64.7 | 0.322 | 16.8 | 0.043 |
| 23 | 0.05% Topanol CA + 100 ppm P as barium hypophosphite + 0.1% Barium thiodipropionate | 57.4 | 0.321 | 17.4 | 0.041 |

EXAMPLES 24–27

These examples are similar to Examples 15–23 except that the 6,6 nylon contained 5% by weight of an ethoxylated alkylamine antistatic agent instead of an ethoxylated polycaproamide.

COMPARATIVE EXAMPLES P–Q

These examples are the same as Examples 24–27 except that the stabilizing additives are outside the scope of the present invention.

| EXAMPLE | STABILIZING ADDITIVE | Initial Analysis | | Change in analysis | |
|---|---|---|---|---|---|
| | | AEG | B | $-\Delta$ AEG | $\Delta$ b |
| P | 0.05% Topanol CA + 100 ppm P as sodium hypophosphite | 78.0 | 0.320 | 22.6 | 0.032 |
| Q | 0.1% Topanol CA + 100 ppm P as sodium hypophosphite | 81.2 | 0.317 | 16.7 | 0.029 |
| 24 | 0.05% Topanol CA + 100 ppm P as sodium hypophosphite + 0.1% Zinc diisopropyl dithiophosphate | 86.6 | 0.322 | 18.8 | 0.020 |
| 25 | 0.05% Topanol CA + 100 ppm P as sodium hypophosphite + 0.1% Zinc dibenzyl dithiocarbonate | 83.9 | 0.314 | 17.2 | 0.018 |
| 26 | 0.05% Topanol CA + 100 ppm P as sodium hypophosphite + 0.1% Zinc thiodipropionate | 86.6 | 0.320 | 24.7 | 0.045 |
| 27 | 0.05% Topanol CA + 100 ppm P as barium hypophosphite + 0.1% Zinc diisopropyl dithiophosphate | 66.4 | 0.321 | 10.4 | 0.029 |

What I claim is:

1. A polyamide composition consisting essentially of
   a. a synthetic linear polyamide;
   b. from 0.005 to 0.5% by weight based on the polyamide of a sterically hindered phenol bearing a secondary of tertiary alkyl or cycloalkyl group in the ortho position;
   c. from 10 to 1,000 parts per million by weight based on the polyamide of phosphorus in the form of a reducing phosphorus compound; and
   d. from 0.005 to 0.5% by weight based on the polyamide of a reducing sulphurcontaining compound selected from the group consisting of a metal salt, an ammonium salt or an organic ester of thiophosphoric acid, thiodipropionic acid and thiocarbamic acid.

2. A polyamide according to claim 1 containing 25 to 250 parts per million by weight based on the polyamide of phosphorus in the form of the reducing phosphorus compound.

3. A polyamide according to claim 1 in which the reducing phosphorus compound is selected from the group consisting of ortho-phosphorus, meta-phosphorous, pyro-phosphorous, hypo-phosphorous and phenylphosphinic acids, and their organic and inorganic salts and their esters.

4. A polyamide according to claim 1 containing an ethoxylated antistatic compound.

* * * * *